UNITED STATES PATENT OFFICE.

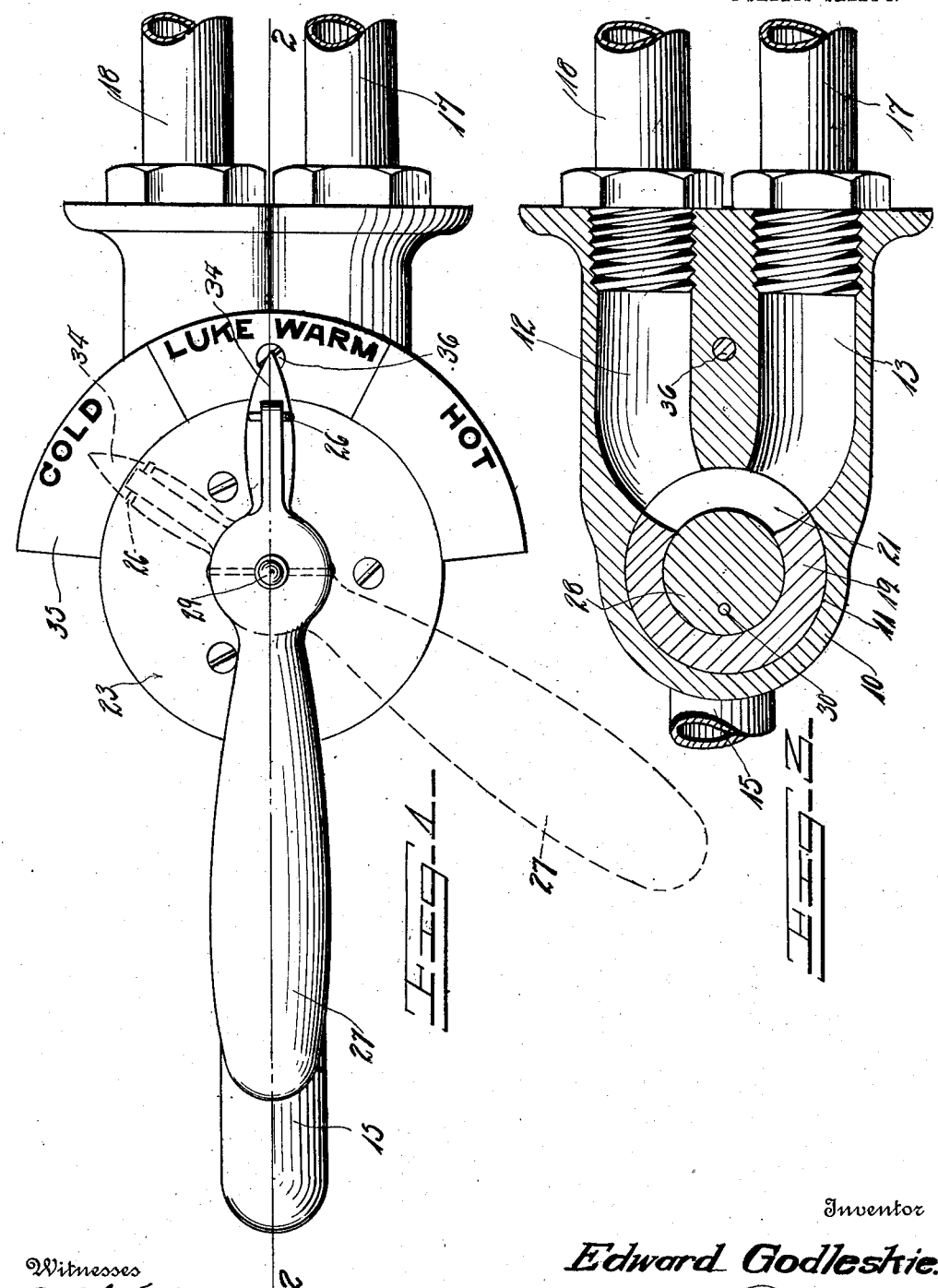

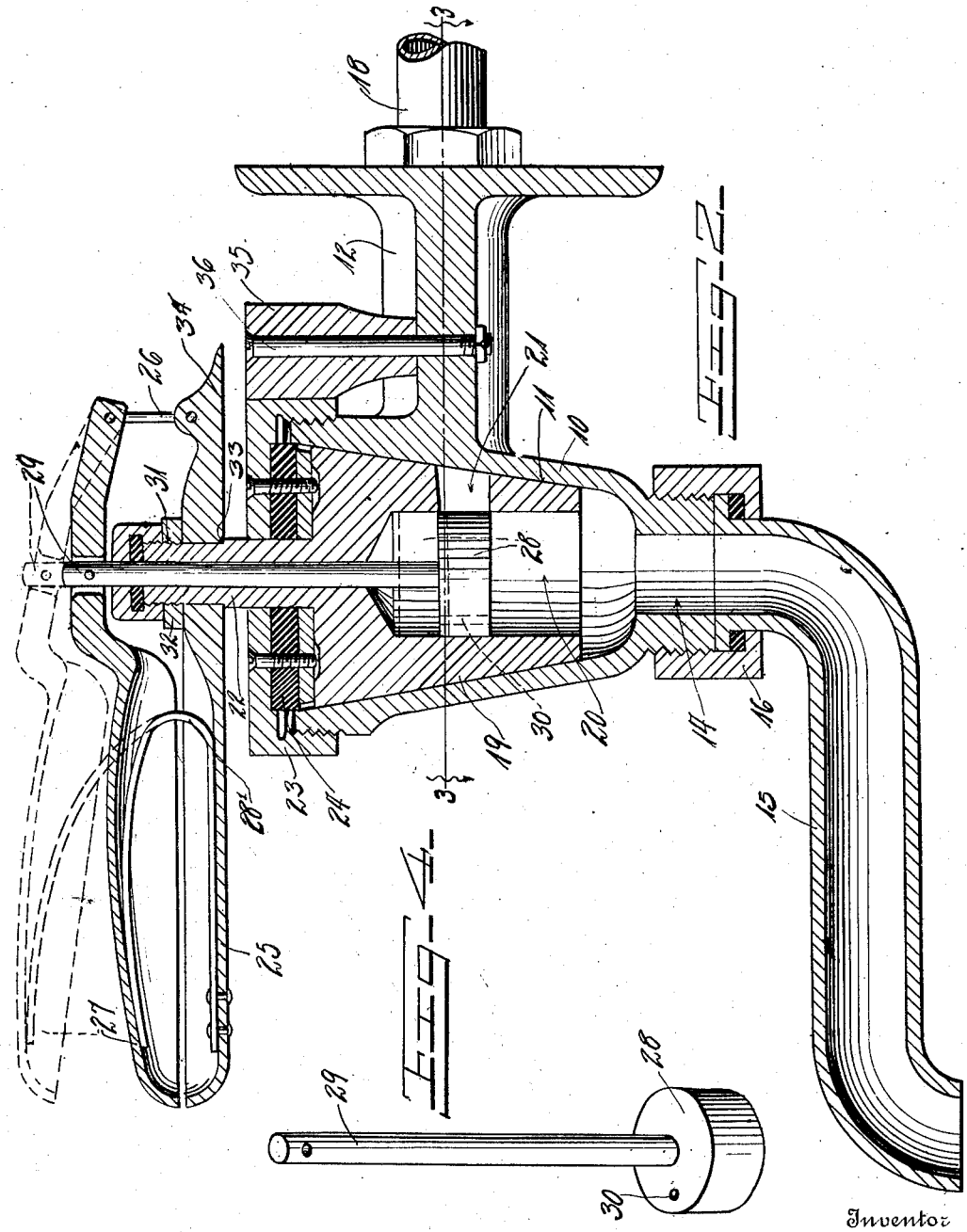

EDWARD GODLESKIE, OF SUNBURY, PENNSYLVANIA, ASSIGNOR OF ONE-FOURTH TO JEFFERSON E. SHIPMAN, OF SUNBURY, PENNSYLVANIA.

FAUCET.

998,496.         Specification of Letters Patent.     Patented July 18, 1911.

Application filed August 30, 1910. Serial No. 579,649.

*To all whom it may concern:*

Be it known that I, EDWARD GODLESKIE, a citizen of the United States, residing at Sunbury, in the county of Northumberland, State of Pennsylvania, have invented certain new and useful Improvements in Faucets; and I do hereby declare the following to be a full, clear, and exact description of the invention, such as will enable others skilled in the art to which it appertains to make and use the same.

This invention relates to faucets.

The object of the invention resides in the provision of a faucet adapted to be attached simultaneously to hot and cold water supply pipes and which has the valve thereof so arranged that water may be delivered by said faucet in either a hot, cold or luke warm state.

A further object of the invention resides in providing means for controlling the rapidity of delivery of water by said faucet independent of the rotation of its valve.

With the above and other objects in view the invention consists in the details of construction and in the combination and arrangement of parts as will be hereinafter more fully described and particularly pointed out in the appended claims.

In describing the invention in detail reference will be had to the accompanying drawings wherein like characters of reference denote corresponding parts in the several views; and in which, Figure 1 is a plan view of a faucet constructed in accordance with the invention with a fragment of hot and cold water supply pipes connected therewith; Fig. 2, a section on the line 2—2 of Fig. 1 with certain parts shown in elevation; Fig. 3, a section on the line 3—3 of Fig. 2 with the hot and cold water supply pipes shown in elevation and the delivery spout of the faucet broken away; and, Fig. 4, a detail perspective view of the plunger employed herewith for controlling the rapidity of delivery of the faucet independent of the rotation of its valve.

Referring to the drawings, 10 indicates the casing of the faucet which is provided with a vertical tapering recess 11, a pair of intake ports 12 and 13 opening into said recess intermediate the ends of the latter, and a discharge port 14 opening into the recess 11 at the base thereof. A delivery spout 15 is secured to the lower end of the casing 10 by means of a cap 16; the bore of said port 15 being in communication with the discharge port 14 of the casing. Secured in the outer end of the intake port 13 is a hot water supply pipe 17, while a cold water supply pipe 18 is secured in the outer end of the intake port 12.

Rotatably mounted in the recess 11 of the casing 10 is a tapering plug 19 which latter has formed in its lower end a vertical recess 20, while a transverse aperture 21 is also formed in said plug and opens at its outer end through the outer face of the plug and at its inner end into the recess 20 intermediate the ends of the latter. This aperture 21 is of such shape that when the plug 19 is rotated it may be placed in separate or collective communication with the supply pipes 17 and 18. A stem 22 rises from the upper end of the plug 19; said stem being of tubular formation and having its bore extended and entering into the recess 20.

The upper end of the recess 11 is closed by a cap 23 screwed on the casing and a rubber washer 24 secured to the under face of said cap and disposed between same and the top of the plug 19 serves to provide against leakage by way of the outer face of the stem 22.

Mounted upon the stem 22 is the lower section 25 of a two part handle which has pivotally connected thereto at one end by means of a link 26 the other section 27 of said handle. A bow spring 28' is carried by the section 25 of the handle and normally tends to hold the section 27 in the position shown in dotted lines in Fig. 2.

Slidingly mounted in the recess 20 is a plunger 28 which is provided with an upwardly extending stem 29 passing through the bore of the tubular stem 22. The upper or free end of the stem 29 is suitably connected to the section 27 of the handle so that the movements of said section will slide the plunger 28 so as to cover and uncover the aperture 21. It will thus be seen that when the section 27 of the handle is moved to normal position under influence of the spring 28' the plunger 28 is in turn positioned so as to uncover the aperture 21 and thus permit a full flow of water through said aperture. When the plug 19 is rotated by the handle so as to dispose the aperture 21 in collective communication with the ports 12 and 13 a very large flow of water will pass through said aperture and result in splashing if the faucet is utilized in connection with a stationary wash stand or the like. In such an instance the plunger 28 is depressed through the medium of the section 27 so as to partially cover the aperture 21. By this operation the supply of water issuing from the aperture 21 may be increased or decreased as desired. The plunger 28 is provided with a passage 30 opening through its top and bottom and serving to drain any water that may escape into the space between the top of the plunger and the inner end of the recess 20.

The stem 22 of the ply is threaded near its outer end as at 31 and a nut 32 is mounted on said threaded portion of the stem for binding the section 25 of the handle against a shoulder 33 formed on the outer face of the stem 22. By this construction the section 25 of the handle is secured against independent rotation with respect to the stem 22.

One end of the section 25 of the handle is provided with a pointer 34 which traverses, during the rotation of the handle, the upper face of an arcuate indicator plate 35; said plate being secured to the casing by a bolt 36 and having indicated on its upper face three divisions; the terminal divisions being marked "Hot" and "Cold" and the intermediate division "Lukewarm". The handle, indicator plate and plug 19 are so related that when the pointer 34 of the handle rests in a given division of the indicator plate the status of the valve is in accordance with such indication.

What is claimed is:

1. In a faucet, the combination of a casing provided with a pair of intake ports and a discharge port, a plug rotatably mounted in said casing and having a recess in its lower end in communication with the discharge port and also having a transverse aperture opening through the wall of said recess intermediate the ends of the latter adapted to be moved into separate or collective communication with the intake ports when the plug is rotated, a handle for rotating said plug and including a pivoted section, a plunger slidably mounted in said recess adapted to uncover and cover said aperture, connections between said plunger and the pivoted section of the handle whereby the movement of the latter will slide said plunger, and a spring constantly tending to move the pivoted section of the handle to shift the plunger so as to uncover said transverse aperture.

2. In a faucet, the combination of a casing provided with a pair of intake ports and a discharge port, a plug rotatably mounted in said casing and having a recess in its lower end in communication with the discharge port and also having a transverse aperture opening through the wall of said recess intermediate the ends of the latter adapted to be moved into separate or collective communication with the intake ports when the plug is rotated, a handle for rotating said plug and including a pivoted section, a tubular stem rising from the upper end of said plug and having its bore in communication with the recess in the lower end of the plug, a plunger slidably mounted in said recess adapted to cover and uncover said aperture, a stem on the upper side of said plunger movable longitudinally in the bore of the stem rising from the plug, and connections between the stem of the plunger and the pivoted section of the handle whereby the movements of said section will slide said plunger.

3. In a faucet, the combination of a casing provided with a pair of intake ports and a discharge port, a plug rotatably mounted in said casing and having a recess in its lower end in communication with the discharge port and also having a transverse aperture opening through the wall of said recess intermediate the ends of the latter adapted to be moved into separate or collective communication with the intake ports when the plug is rotated, a handle for rotating said plug and including a pivoted section, a tubular stem rising from the upper end of said plug and having its bore in communication with the recess in the lower end of the plug, a plunger slidably mounted in said recess adapted to cover and uncover said aperture, a stem on the upper side of said plunger movable longitudinally in the bore of the stem rising from the plug, and spring actuated means for normally holding the pivoted section in the handle so that the aperture of the plug will be uncovered by said plunger.

In testimony whereof, I affix my signature, in presence of two witnesses.

EDW. GODLESKIE.

Witnesses:
JOHN W. BASSLER,
W. J. KERSTETTER.